United States Patent [19]

Kedem

[11] Patent Number: 6,076,148
[45] Date of Patent: Jun. 13, 2000

[54] MASS STORAGE SUBSYSTEM AND BACKUP ARRANGEMENT FOR DIGITAL DATA PROCESSING SYSTEM WHICH PERMITS INFORMATION TO BE BACKED UP WHILE HOST COMPUTER(S) CONTINUE(S) OPERATING IN CONNECTION WITH INFORMATION STORED ON MASS STORAGE SUBSYSTEM

[75] Inventor: Nadav Kedem, Tel-Aviv, Israel

[73] Assignee: EMC Corporation, Hopkinton, Mass.

[21] Appl. No.: 08/998,463

[22] Filed: Dec. 26, 1997

[51] Int. Cl.[7] ................................................... G06F 12/00
[52] U.S. Cl. ............................................................. 711/162
[58] Field of Search ............................................. 711/162

[56] References Cited

U.S. PATENT DOCUMENTS

| 5,175,849 | 12/1992 | Schneider | 707/202 |
| 5,212,784 | 5/1993 | Sparks | 714/6 |
| 5,241,670 | 8/1993 | Eastridge et al. | 714/1 |
| 5,535,381 | 7/1996 | Kopper | 710/52 |

*Primary Examiner*—David L. Robertson
*Attorney, Agent, or Firm*—Richard A. Jordan; John M. Gunther

[57] ABSTRACT

A computer system includes a host computer, a mass storage subsystem and a backup subsystem for backing up information stored on the mass storage subsystem. The mass storage subsystem stores information on a series of tracks. A backup bit map includes a plurality of bits each associated with a respective one of the tracks and indicates the backup status of the track during a backup operation. Initially, during a backup operation, the bits associated with the tracks to be backed up will be set. Generally, the mass storage subsystem transfers information from the track to be backed up in order of the bits in the bit map, and after each track is backed up, it will clear the track's bit. However, when the host is to store information in the mass storage subsystem, it will determine whether the bit associated with the track in which the information is to be stored is set and, if so, enable the mass storage subsystem to back up the track out of turn, and to re-set the track's bit. After the information has been retrieved from the track, the bit associated therewith will be reset, and the host will store the information in the track. This allows the mass storage subsystem to ensure that the backed up information will correspond to the information as of the beginning of the backup operation, and in addition will allow the host to continue operations during the backup operation.

22 Claims, 8 Drawing Sheets

6,076,148

MASS STORAGE SUBSYSTEM AND BACKUP ARRANGEMENT FOR DIGITAL DATA PROCESSING SYSTEM WHICH PERMITS INFORMATION TO BE BACKED UP WHILE HOST COMPUTER(S) CONTINUE(S) OPERATING IN CONNECTION WITH INFORMATION STORED ON MASS STORAGE SUBSYSTEM

FIELD OF THE INVENTION

The invention relates generally to the field of digital data processing systems and more particularly to digital storage systems. The invention provides a system and method for performing backup of information stored on a mass storage subsystem which stores information on, for example, one or more disk storage devices, while allowing host computers which use information stored on the mass storage subsystem to continue operations in connection with information stored on the mass storage subsystem while the backup is taking place.

BACKGROUND OF THE INVENTION

Digital computer systems are used in a number of applications in which virtually continuous availability of data is important to the operation of businesses or other entities using the systems. Generally, computer centers will periodically produce back-up copies of data on their various digital computer systems. Such back-up copies are usually not maintained on a continuous basis, but instead at particular points in time, often at night when the normal processing load on the computer centers is reduced and modifications to the data being backed up may be minimized, and in any case represent the data at the particular points in time at which the back-up copies are generated. Accordingly, if a failure occurs between back-ups, data which has been received and processed by the digital computer systems since the last back-up copy was produced, may be lost. Typically, such back-up copies will be maintained by the computer centers at their respective sites so that they may be used in the event of a failure, although some off-site archival back-ups may be maintained. Significant additional problems arise in the case of, for example, catastrophic events that can occur, such as may result from, for example, fire, flood or other natural disasters, intentional tampering or sabotage and the like, which may result in unintentional or intentional damage to an entire site or some significant portion thereof, since some or all of the back-up copies may also be damaged and the data contained thereon may be unavailable.

One problem that arises in connection with backing up information is that generally, during the backup operation, the mass storage subsystem from which information is being backed up is generally unavailable for the duration of the backup operation. This is generally necessary since typically it is desired to have the backup reflect the state of the information stored on the mass storage subsystem at a particular point in time, such as at the beginning of the backup operation, so that the backup will provide a "snapshot" of the information at that point in time. If the mass storage subsystem were available during a backup operation, the information would likely be updated during the backup operation, in which case it would be impossible to determine whether the backed up information represented the state of the information at the beginning of the backup operation, at the end, or sometime in between.

To alleviate this problem, mass storage subsystems have been developed which maintain a number of copies of the information in a mirrored arrangement. An illustrative such subsystem is described in U.S. patent application Ser. No. 08/820,912, filed Mar. 19, 1997 in the name of Philip Tamer, et al., entitled RDF-Based and MMF-Based Backups now U.S. Pat. No. 6,035,412, and assigned to the assignee of the present invention. In such a subsystem, at the beginning of a backup operation, one of the mirrored copies is separated from the others and is used as the copy to provide information for the backup. During the backup operation, the other copies (that is, the copies which are not used to provide information for the backup) may be updated, but the copy which provides information for the backup is not updated. Accordingly, the copy which provides the information for the backup will remain in the state in which it was at the beginning of the backup operation during the entire backup operation. At the end of the backup operation, the copy which provided information for the backup will be re-synchronized with the other copies, and during the backup operation, information as to the updates which were made to the other copies will be maintained for use in the re-synchronization.

One problem that arises in connection with such an arrangement is that it requires maintaining a number of mirrored copies to be maintained. Preferably, the mass storage subsystem will need to maintain at least two mirrored copies in an "online" state at all times, even during a backup operation. Accordingly, a third copy will also need to be maintained which can be used in the backup. A further problem can arise if it is desired to have the backup copies represent snapshots of the information stored on the mass storage subsystem at different points in time, which may require backup operations to overlap. This can occur, for example, if backup operations are initiated at desired time intervals, which are less than the amount of time required to complete each backup operation.

SUMMARY OF THE INVENTION

The invention provides a new and improved system and method for performing backup of information stored on a mass storage subsystem which stores information on, for example, one or more disk storage devices, while allowing host computers which use information stored on the mass storage subsystem to continue operations in connection with information stored on the mass storage subsystem while the backup is taking place.

In brief summary, a computer system constructed in accordance with the invention includes a host computer, a mass storage subsystem and a backup subsystem for backing up information stored on the mass storage subsystem. The mass storage subsystem stores information on a series of tracks. A backup bit map includes a plurality of bits each associated with a respective one of the tracks and indicates the backup status of the track during a backup operation. Initially, during a backup operation, the bits associated with the tracks to be backed up will be set. Generally, the mass storage subsystem transfers information from the track to be backed up in order of the bits in the bit map, and after each track is backed up, it will clear the track's bit. However, when the host is to store information in the mass storage subsystem, it will determine whether the bit associated with the track in which the information is to be stored is set and, if so, enable the mass storage subsystem to back up the track out of turn, and to re-set the track's bit. After the information has been retrieved from the track, the bit associated therewith will be reset, and the host will store the information in the track. This allows the mass storage subsystem to ensure that the backed up information will correspond to the information as of the beginning of the backup operation, and in addition will allow the host to continue operations during the backup operation.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
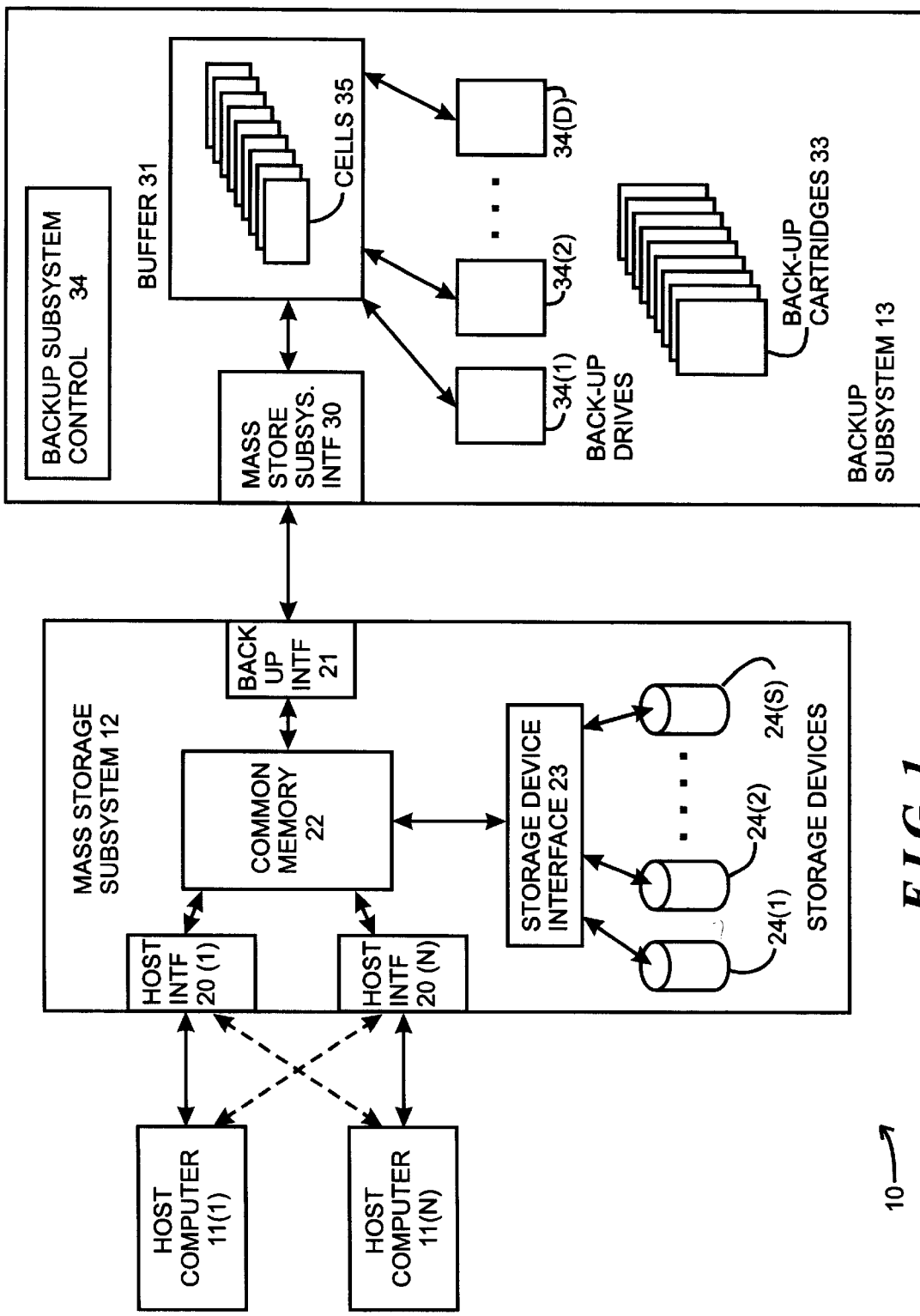
FIG. 1 is a functional block diagram of a digital data processing system including a mass storage subsystem and a backup subsystem constructed in accordance with the invention.

FIG. 1 is a functional block diagram of a digital data processing system 10 including an arrangement for backing up data, constructed in accordance with the invention. With reference to FIG. 1, digital data processing system 10 includes one or more host computers 11(1) through 11(N) (generally identified by reference numeral 11(n), a mass storage subsystem 12 and a backup subsystem 13. The mass storage subsystem 12 stores information used by the host computers 11(n) in their processing, and receives processed information from the host computers 11(n) for storage. The mass storage subsystem 12 includes a mass- or secondary-storage subsystem which stores data in disk-based storage. In one embodiment, the mass storage subsystem 12 comprise the mass storage subsystem similar to that described in, for example, U.S. Pat. No. 5,206,939, entitled "System And Method For Disk Mapping And Data Retrieval," issued Apr. 27, 1993 to Moshe Yanai, et. al., U.S. patent application Ser. No. 07/893,509 filed Jun. 4, 1995, in the name of Moshe Yanai, et al., entitled "System And Method For Dynamically Controlling Cache Management," and U.S. Pat. No. 5,592, 432, entitled "Cache Management System Using Time Stamping For Replacement Queue," issued Jan. 7, 1997 in the name of Natan Vishlitzky, et al., all of which are assigned to the assignee of the present invention and incorporated herein by reference, although it will be appreciated that any mass storage subsystem may be used with the present invention. In that embodiment, the mass storage subsystem 12 includes one or more disk storage units which store information in a basis which permits the host computers 11(n) to retrieve the information from, the mass storage subsystem 12, and provide processed information for storage on the mass storage subsystem 12, on a relatively random basis. In addition, in that embodiment, the mass storage subsystem 12 utilizes large cache memories to cache information retrieved from the disk storage units to be transferred to the host computers 11(n) for processing, as well as updated information provided by the host computers 11(n) to be transferred to the disk storage units for storage. The mass storage subsystem 12 may store information in multiple mirrors, which can provide some online protection for continued availability of the information stored therein in the event of failure of some portions of the mass storage subsystem 12.

The backup subsystem 13 is provided to back up information stored on the mass storage subsystem 12. In the event of a malfunction on the mass storage subsystem 12, which may render some or all of the information stored on the mass storage subsystem 12 unavailable to the host computers 11(n), it (that is, the information) can be restored from the backup subsystem 13 to another mass storage subsystem, or to the same mass storage subsystem 12 after the malfunction has been corrected. After the information has been restored, it (that is, the restored informational will thereafter be available to the host computers 11(n). In one embodiment, the backup subsystem 13 includes a mass data storage facility similar to that described in U.S. patent application Ser. No. 08/774,121, filed Dec. 23, 1996, in the name of Haim Bitner, et al., entitled "Remote Mass Data Storage Facility For Digital Data Processing System(s)," assigned to the assignee of the present invention and incorporated herein by reference. In that embodiment, the backup subsystem 13 stores information received from the mass storage subsystem 12 on, for example, magnetic tape cartridges or the like, which may be offline, and for which location of any particular item of information may take a relatively long time in comparison to the time required by the mass storage subsystem 12.

More particularly, and with continued reference to FIG. 1, the mass storage subsystem 12 includes one or more host interfaces 20(1) through 20(N) (generally identified by reference numeral 20(n)), a backup interface 21, a common memory 22, a storage device interface 23 and one or more storage devices 24(1) through 24(S) (generally identified by reference numeral 24(s). The storage devices 24(s) store information to be retrieved for the host computers 11(n). In addition, processed information generated by the host computers 11(n) for storage by the mass storage subsystem 12 will be stored on the storage devices 24(s).

In one embodiment, the storage devices 24(s) comprise disk storage units which s,tore information on a plurality of disk surfaces, each of which is divided into a plurality of tracks. Each host interface 20(n) is connected to one or more host computers 11(n), and receives storage and retrieval requests therefrom. In addition, each host interface 20(n) is connected to the common memory 22. The storage device interface 23 is connected to the storage devices 24(s) to retrieve information therefrom and store information therein. The storage device interface 23 is also connected to the common memory 22. Generally, the common memory 22 provides a cache memory for buffering information retrieved the storage devices 24(s) for transfer by the host interfaces 20(n) to a respective host computer 11(n) in response to a retrieval request therefrom. In particular, during a retrieval operation performed in response to a retrieval request from a host computer 11(n), a host interface 20(n) connected thereto will enable the storage device interface 23, in turn, retrieve a copy of a track of information containing the information to be retrieved, from the storage device $24(s_R)$ on which the information is stored, and transfer it to the common memory 22 for buffering. After the information from the track has been buffered in the common memory 22, the storage device interface 23 will notify the host interface 20(n), which, in turn, can retrieve the particular information to be retrieved from the copy of the track as buffered in the common memory 22.

In addition, the common memory 22 buffers processed information received from a host computer 11(n) to be stored in a storage device 24(s$_S$). In particular, during a storage operation performed in response to a storage request form a host computer 11(n), a host adapter 20(n) connected thereto will buffer the processed information in the common memory 22. Thereafter, the host adapter 20(n) will notify the storage device interface 23, which, in turn, will retrieve the buffered processed information from the common memory 22 for storage in a storage device 24(s$_s$).

In one particular embodiment, the host interfaces 20(n) and storage device 23 also communicate through data structures such as tables and queues (not separately shown) which are stored in the common memory 22.

As noted above, the backup subsystem 13 backs up information stored on the mass storage subsystem 12 so that, in the event of a malfunction on the mass storage subsystem 12, which may render some or all of the information stored on the mass storage subsystem 12 unavailable to the host computers 11(n), it (that is, the information) can be restored from the backup subsystem 13 to another mass storage subsystem, or to the same mass storage subsystem 12 after the malfunction has been corrected. After the information has been restored, it (that is, the restored information) will thereafter be available to the host computers 11(n). The backup subsystem 13 includes a amass storage subsystem interface 30, a buffer 31, a plurality of drives 32(1) through 32(D) (generally identified by reference numeral 32(d)) and a number of cartridges 33, operating under control of a backup subsystem control 34. During a backup operation, the mass storage subsystem 12 transfers information to be backed up through the backup interface 21, and the backup subsystem 13 receives the information through its mass storage subsystem interface 30. The mass storage subsystem interface 30, in turn, buffers the information to be backed up in the buffer 31. The information to be backed up, in turn, is transferred from the buffer 31 to respective ones of the drives 32(d) for storage on a respective one of the cartridges 31.

During a backup operation, information is transferred from the storage devices 24 to the backup interface 21 in a manner generally similar to the manner in which information is transferred from the storage devices 24(s) to a host interface 20(n) during a retrieval operation. That is, the backup interface 21 will enable the storage device interface 23 to retrieve each information from each track to be backed up from the storage device 24(s$_B$) and store a copy of it (that is, the information) in the common memory 22. After the information from the respective track has been stored in the common memory 22, the backup interface 21 can retrieve it from the common memory and transfer it (that is, the information) to the backup subsystem 13 for storage. The storage device interface 23 and the backup interface 21 communicate through data structures maintained in the common memory 22, in a manner similar to the manner in which the storage device interface 23 and host interfaces 20(n) communicate, as described above.

When backed-up information is to be restored, the cartridge or cartridges on which the information has been stored are mounted on respective drives 32(d) and the information retrieved therefrom and stored in the buffer 31. Thereafter, the retrieved information will be transferred through the mass storage subsystem interface 30 and the backup interface 21 for storage in the common memory 22. Thereafter, the storage device interface 23 will retrieve the information to be restored from the common memory for storage in the appropriate storage device(s) 24(s).

The invention provides an arrangement which permits the mass storage subsystem 12 and backup subsystem 13 to engage in a backup operation, to transfer information from the mass storage subsystem 12 to the backup subsystem 13 for storage, while allowing the host computers 11(n) to have access to the mass storage subsystem 12 and information stored therein during the backup operation. More particularly, the invention provides a mechanism by which the host computers 11(n) can initiate a storage operation in connection with information from tracks to be backed up, while at the same time ensuring that the state of the backed-up information as stored on the backup subsystem 13 will correspond to the state of the information as stored by the mass storage subsystem 12 at the beginning of the backup operation. Thus, the invention provides an arrangement by which the backed up information as stored on the backup subsystem 13 during the backup operation is a "snapshot," as of the beginning of the backup operation, of at least the portion of the information stored on the mass storage subsystem 12 that is to be backed up during the backup operation, while at the same time allowing the host computers 11(n) to initiate storage operations in connection with the tracks whose information is to be backed up.

Figures 2A, 2B:
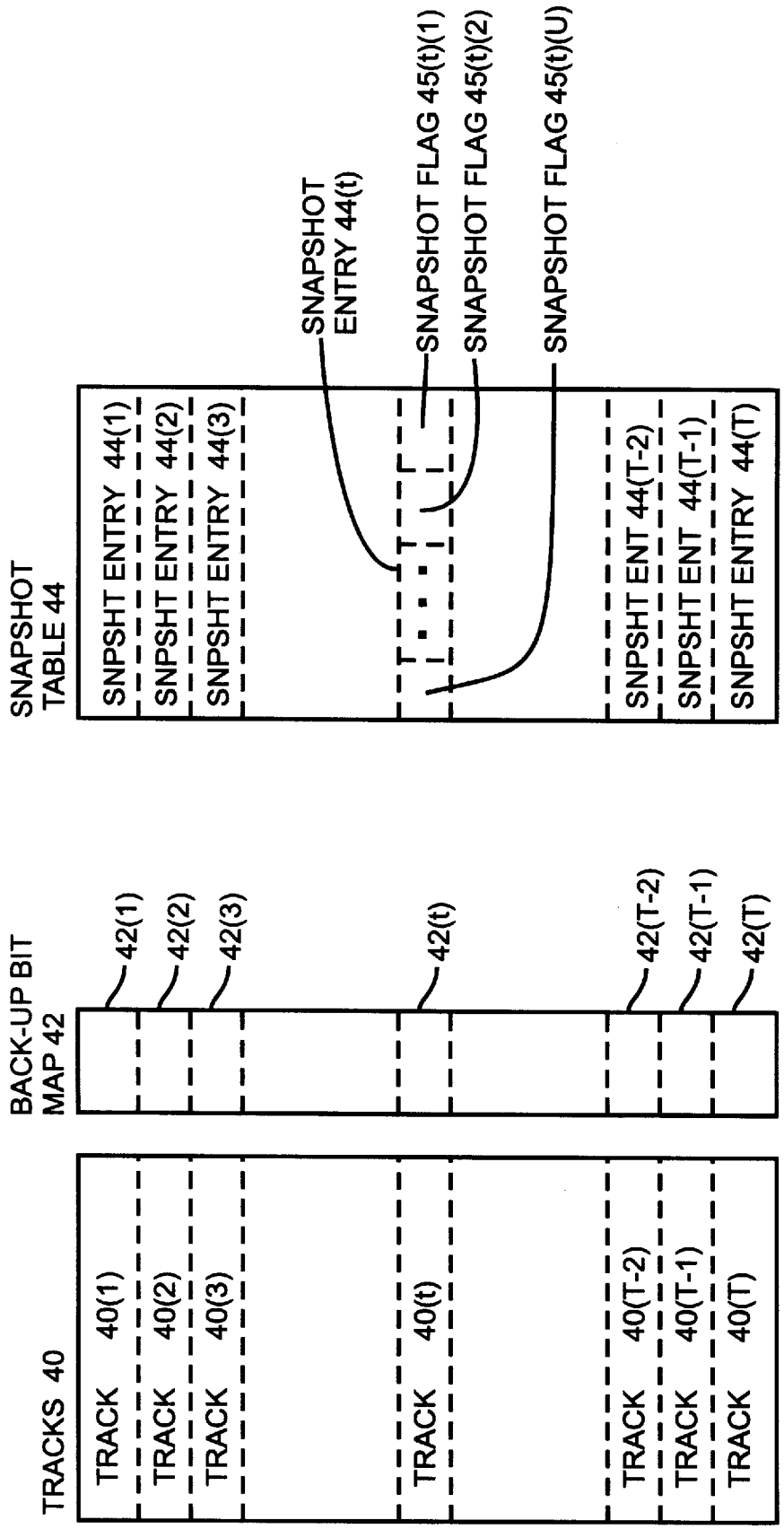
FIGS. 2A and 2B depict details of data structures used in the mass storage subsystem, which are useful in understanding the invention.
Figure 3:
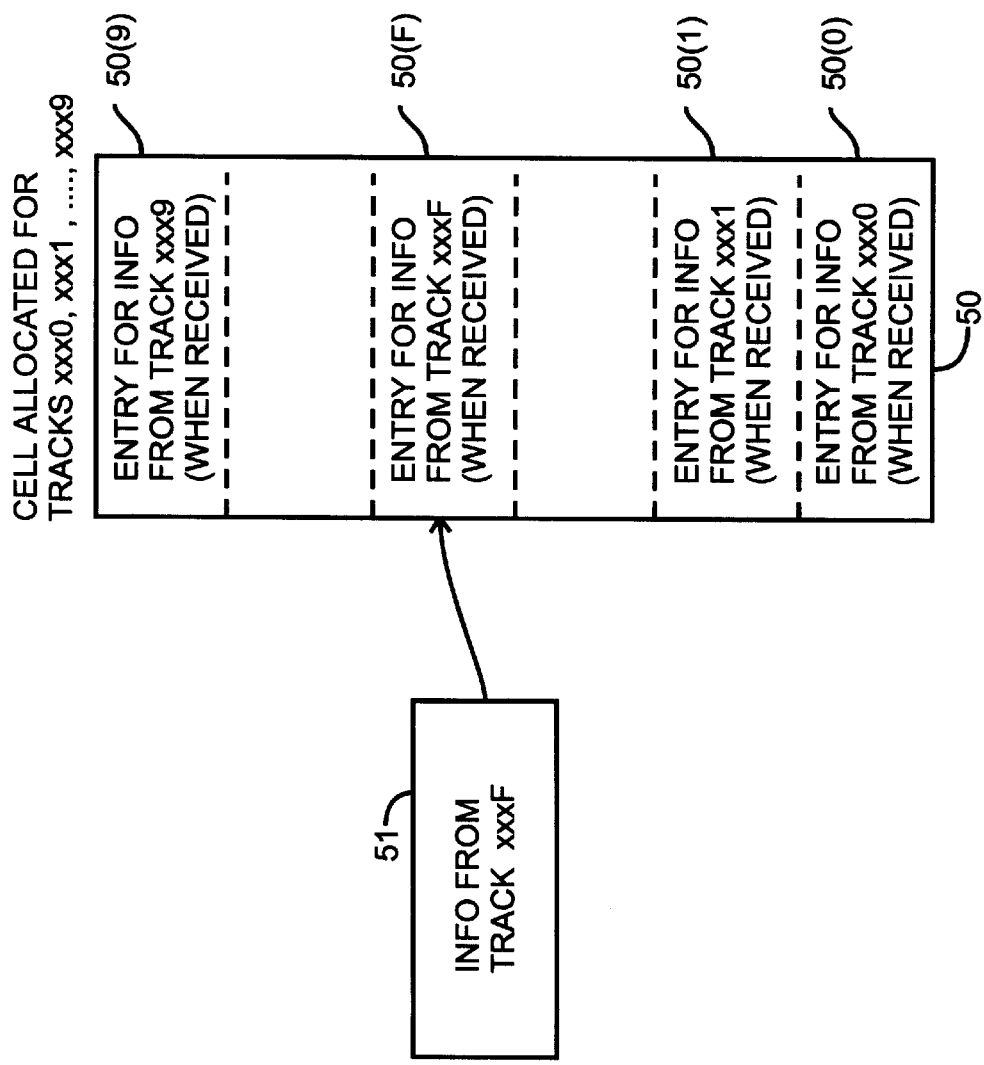
FIG. 3 depicts details of a data structure used in the backup subsystem useful in understanding the invention.

Before proceeding further, it would be helpful to describe certain data structures which are used in connection with a backup arrangement in connection with the invention. FIGS. 2A and 2B depict details of data structures used in the mass storage subsystem 12, and FIG. 3 depicts details of a data structure used in the backup subsystem 13. As noted above, each storage device 24(s) stores information in a plurality of tracks, which are schematically represented in FIG. 2A as tracks 40(1) through 40(T). Each storage device 24(s) includes a series of tracks 40(t$_B$) . . . 40(t$_E$) so that, for example, tracks 40(1) through 40(t$_1$) can correspond to a series of tracks on storage device 24(1), tracks 40(t$_1$+1) through 40(t$_2$) can correspond to a series of tracks on storage device 24(2) and, so forth.

To accommodate backup in connection with the invention, the mass storage subsystem 12 is provided with a backup bit map 42, which is used to identify the ones of the tracks 40(t) which are to be backed up during a backup operation. The backup bit map 42 includes a plurality of bits 42(1) through 42(T) (generally identified by reference numeral 42(t)), each of which is associated with a correspondingly-indexed track 40(t). At the beginning of a backup operation, the ones of the bits 42(t) that are associated with the tracks 40(t) that are to be backed up during the backup operation will be set. If any of the bits 42(t) that are associated with tracks 40(t) that are not to be backed up happen to be in the set condition, they will preferably be cleared. The backup bit map 42 is preferably maintained in the common memory 22, and the respective bits 42(t) may be conditioned to the respective set or clear condition by a host interface 20(n) in response to a request to initiate a backup operation provided by a host computer 11(n). Alternatively, the bits 42(t) may be conditioned by the storage device interface 23 or another component (not shown) of the mass storage subsystem 12 in response to a backup initiation process which may be executed automatically within the mass storage subsystem 12. In any case, typically during a backup operation, a range of tracks, extending from, for example, track 40(t$_B$) to track 40(t$_E$) will be backed up, in which case the bits 42(t$_B$) through 42(t$_E$) will be set, and the other bits 42(t) of the backup bit map 42 will be clear.

The backup interface 21 monitors the backup bit map 42 and, if any of the bits 42(t) is set, will operate to initiate retrievals from the respective storage devices 24(s) for transfer to the backup subsystem 13 for backup storage.

More particularly, backup interface 21 sequences through the successive bits 42(t) of the backup bit map 42 and, when it determines that the bit 42($t_X$) ($t_B \leq t_X \leq t_E$) associated with a track 40($t_X$) is set, it will enable the storage device interface 23 to retrieve the information from the track 40($t_X$) from the appropriate storage device 24(s) and store it (that is, the information) in the common memory 22. After the information from track 40($t_X$) has been stored in the common memory 22, the backup interface 21 can retrieve it from the common memory 22 for transfer to the backup subsystem 13 for backup storage. In addition, the backup interface 21 will clear the bit 42($t_X$) associated with the track 40($t_X$) backed up. These operations will be repeated for each of the tracks 40(t) for which the associated bit 42(t) is set. When the backup interface 21 sequences to a bit 42(t) that is not set, it will sequence to the next bit 42(t+1) without operating to backup the information in the track 40(t) associated therewith. In addition, when the backup interface 21 sequences to the last bit 42(T) in the backup bit map 42, it will resume sequencing with the first bit 42(1) in the bit map. Thus, the backup interface will continually and iteratively sequence through the successive bits 42(t) of the backup bit map 42, and, for each bit 42(t) that is set, will retrieve the information from the track 40(t) associated therewith and transfer it (that is, the information) to the backup subsystem 13 for backup storage.

In further accordance with the invention, when a host interface 20(n) receives a storage request from a host 11(n), before initiating a storage operation to store the information to be stored in the common memory, will test the bit 42($t_S$) associated with the track 40($t_S$) in which the information is to be stored. If host interface 20(n) determines that the bit 42($t_S$) is clear, indicating either (i) that the associated track 40($t_S$) is not one of the tracks 40(t) which are to be backed up during a backup operation, or (ii) if the associated track 40($t_S$) is one of the tracks which are to be backed up during a backup operation, that the backup interface 21 has already initiated the retrieval of the information from the track 40($t_S$) for transfer to the backup subsystem 13, then it (that is, the host interface 20(n)) will proceed with the storage operation as described above, to store the information in the common memory 22 and enable the storage device interface 23 to store the information in the appropriate storage device 24(s). However, if the host interface 20(n) determines that the bit 42($t_S$) is set, indicating that (iii) the associated track 40($t_S$) is one of the tracks 40(t) which are to be backed up during the backup operation, and (iv) the backup interface 21 has not initiated retrieval of the information from the track 40($t_S$) for transfer to the backup subsystem 13, then it (that is, the host interface 20(n)) will provide a notification to the backup interface 21 to immediately initiate the retrieval of the information from the track 40($t_S$) for transfer to the backup subsystem 13. In that case, the backup interface 21 may retrieve the information from the track 40($t_S$) and transfer it to the backup subsystem 13 out of turn. In addition, the backup interface 21 will perform the other operations described above in connection with the track 40($t_S$), and in particular will reset the bit 42($t_S$) of the backup bit map 42 associated with the track 40($t_S$).

After the backup interface 21 has transferred the information from the track 40($t_S$) to the backup subsystem 13 for storage, it can resume operations in connection with the next bit of the backup bit map 42 and the associated track in the normal order, that is, the bit 42($t_X$+1) of the backup bit map 42 following the bit 42($t_X$ that it was processing prior to the notification by the host interface 20(n).

Returning to the operations performed by the host interface 20(n) after it determines that the bit 42($t_S$) is set, after the backup interface 21 has reset the bit 42($t_S$) associated with the track 40($t_S$) in which the information is to be stored by the host interface 20(n), the host interface 20(n) can perform the storage operation to store the information for the track 40($t_S$) in the common memory 22, and enable the storage device interface 23 to store the information in the track 40($t_S$) on the appropriate storage device 24(s). The host interface 20(n) can periodically monitor the status of the bit 42($t_S$) to determine when the bit 42($t_S$) has been cleared, or alternatively the backup interface 21 can notify the host interface 20(n) when it resets the bit 42($t_S$).

The backup interface 21 will perform the operations described above in connection with each of the bits in the backup bit map 42, and in particular with the series of bits 42($t_B$), . . . , 42($t_E$) associated with the series of tracks 40($t_B$), . . . , 40($t_E$) which are to be backed up during the backup operations. Thus, when it (that is, the backup interface 21) gets to the bit 42($t_S$) ($t_B \leq t_S \leq t_E$) that is associated with a track 40($t_S$) for which a copy was transferred to the backup subsystem 13 out of turn in response to notification from the host interface 20(n), since at that point the bit 42($t_S$) is clear, it (that is, the backup interface 21) will not transfer that track 40($t_S$) to the backup subsystem 13, but instead will skip to the next bit 42($t_S$+1). If that bit 42($t_S$+1) is set, which may be the case if (i) $b_S$+1$b_E$ and (ii) the backup interface 21 has not reset bit 42($t_S$+1) earlier following notification that a host interface 20(n) was to engage in a storage operation in connection with the information from the associated track 40($t_S$+1), the backup interface 21 will reset the bit 42($t_S$+1) and perform the operations described above to initiate a retrieval of the information from the associated track 40($t_S$+1) by the storage device interface 23 and a transfer it (that is, the information from the associated track 40($t_S$+1)) to the backup subsystem 13.

When the backup interface 21, in sequencing through the backup bit map 42, steps to bit 42($t_E$+1), beyond the bit 42($t_E$) associated with the last track in the range whose information is to be backed up during the backup operation, it (that is, the backup interface 21) will continue operations in connection with that bit and others to the last bit 42(T) in the bit map. However, since those bits 42($t_E$+1), . . . , 42(T) will be clear, the information from the associated tracks 40($t_E$+1), . . . , 40(T) will not be transferred to the backup subsystem 13 for backup storage. As noted above, after reaching the last bit 42(T) in the bit map 42, the backup interface 21 will resume sequencing through the backup bit map 42 with the first bit 42(1) in the bit map 42.

It will be appreciated that, if the bits 42($t_B$), . . . , 42($t_E$) of the backup bit map 42 are set to initiate a backup operation, the backup interface may be processing a bit 42($t_I$) ($t_B < t_I < t_E$) associated with a track 40($t_I$) which is intermediate the range of tracks 40($t_B$), . . . , 40($t_E$) whose information is to be transferred to the backup subsystem 13 for backup storage during the backup operation. In that case, the backup interface 21 will first transfer information from tracks 40($t_I$), . . . , 40($t_E$) to the backup subsystem 13, and will thereafter transfer information from tracks 40($t_B$), . . . , 40($t_I$) to the backup subsystem 13 for backup storage.

It will be appreciated that, by transferring tracks 40(t) to the backup subsystem 13 out of order when a host adapter 20(n) is to engage in a storage operation in connection with therewith during a backup operation, the backup interface 21 will ensure that the information transferred to the backup subsystem 13 for backup storage during the backup operation will reflect the condition of the information stored in the series of tracks $40(t_B), \ldots, 40(t_E)$ which are to be backed up during the backup operation, at the start of the backup operation. Thus, at the end of the backup operation, the information as provided to the backup subsystem 13 for backup storage during the backup operation represents a snapshot of the information stored in the tracks $40(t_B), \ldots, 40(t_E)$ at the beginning of the backup operation.

As described above, the backup subsystem 13 receives information from the mass storage subsystem 12 associated with respective tracks 40(t), it (that is, the backup subsystem 13) will initially buffer the information in the buffer 31. In one embodiment, the backup subsystem 13 will, prior to transferring information to the backup drives 34(d) for storage, accumulate information from a number of tracks. After the information from a predetermined number of tracks has been accumulated, the information will be supplied to the backup drives 34(d) for storage. To enhance efficiency during a restoration operation, when information is transferred from the backup subsystem to either the mass storage subsystem 12 or to another mass storage subsystem, the information maintained in the buffer 31 is organized in cells 35, each of which will be used to accumulate information from a series of sequential tracks $40(t_A), \ldots, 40(t_H)$, before the information is transferred to a backup drive 34(d) for storage on a cartridge 33. This will allow the backed-up information to be maintained in a reasonably good order as recorded on the backup cartridges 33 so that, if a restoration operation is required to restore the information to the mass storage subsystem 12 or another mass storage subsystem, the information can be retrieved from the respective cartridge 33 and transferred to the mass storage subsystem to which the information is being restored in track order $40(t_A), \ldots, 40(t_H)$. Typically the track order $40(t_A), \ldots, 40(t_H)$ also corresponds to the order of tracks on the respective storage devices, and so the information retrieved from the backup cartridges can be stored on the respective storage devices in an efficient manner.

The organization of the respective cells 35, and the storage of information from tracks 40(t) therein, particularly in the case when a track $40(t_S)$ is transferred out of order, as described above in connection with FIG. 2A, will be described in connection with FIG. 3. With reference to FIG. 3, a cell, identified by reference numeral 50, includes a plurality of entries 50(0) through, for example, 50(9) (generally identified by reference numeral 50(f)). Each entry 50(f) in the cell 50 contains enough storage space for information from one track, along with other information, such as identification of the track and other information, which may need to be stored on the backup subsystem 13 along with the information from the track. The series of entries 50(f) of the cell 50 will store a information from a sequence of tracks to be backed up. For example, if each cell 50 has ten entries 50(0) through 50(9) for storing information from tracks identified by sequential numerical track identifiers having decimal representations "xxx0," "xxx1," . . . "xxx9," (where "xxx" represents the high-order digits of the decimal representations of the track identifiers) then (i) entry 50(0) will be used for information from the track whose track identifier is "xxx0," that is, the track whose track identifier has the decimal representation with "zero" as the least significant digit, (ii) entry 50(1) will be used for information from the track whose track identifier is "xxx1," that is, the track whose track identifier has the decimal representation with "one" as the least significant digit, and so forth.

The backup subsystem 13 allocates a new cell 35 when it receives information from a track whose identifier has a high order portion "xxx" for which it (that is, the backup system 13) does not already have a cell. Thus, when the backup subsystem 13 receives information from a track 40(t) from the mass storage subsystem 12, it will initially determine whether the buffer 31 already has a cell that is allocated for tracks whose identifiers have high-order portions "xxx." If the backup subsystem's buffer 31 already contains a cell allocated for tracks whose identifiers have high-order portions "xxx," that cell will be used to store information for the track. On the other hand, if the buffer 31 does not have a cell allocated for tracks whose identifiers have high-order portions "xxx," a new cell will be allocated. In either case, the backup subsystem will store the information from the track in the entry 50(f) of the cell associated with the least significant digit of the identifier associated with the track. Thus, the sequential entries 50(0), 50(1), . . . , 50(9) comprising the cell 50 will store the information from the series of tracks in order of the track's decimal identifier. When the cell 50 is full, then the information from the cell 50 will be transferred to one of the backup drives 34(d) for storage on a backup cartridge 33. The cells thus aggregate information from a number of sequential tracks on the mass storage subsystem 12, even if the tracks are transferred to the backup subsystem 13 out of order, which can aid in efficient retrieval of information from the backup cartridges if a restoration operation is necessary.

Generally, the use of the backup bit map 42 to control operations as described above will suffice to generate one snapshot of information stored on the storage devices 24(s) at a time, the snapshot representing the condition of the information when the bits 42(t) of the backup bit map 42 are set. A refinement and extension of the invention, which will initially be described below in connection with FIGS. 1 and 2B, allows the mass storage subsystem 12 and backup subsystem 13 to generate a number of snapshots on an overlapping basis. Maintaining a number of snapshots on the backup subsystem 13 taken at various times can be useful if, for example, information stored in the mass storage subsystem 12 becomes corrupted, but the corruption is not discovered until after one or more snapshots have been taken; in that case, a snapshot taken before the corruption occurred can be used to in connection with a restoration operation, to restore the information on the mass storage subsystem 12 to an uncorrupted condition. This facility allows multiple snapshots of information stored on the mass storage subsystem 12 to be stored on the backup subsystem 13, even if all of the information required for one snapshot has not yet been transferred to the backup subsystem 13 before the time has arrived at which the next snapshot is to be taken. To accommodate this, instead of providing a backup bit map 42 including a plurality of bits 42(t) each associated with a correspondingly-indexed track 40(t), the mass storage subsystem 12 is provided with a snapshot map table 44 including a plurality of snapshot entries 44(1) through 44(T) (generally identified by reference numeral 44(t)), with each snapshot entry being associated with a correspondingly-indexed track 40(t). Each snapshot map entry 44(t), in turn, comprises a plurality of snapshot flags 45(t)(1) through 45(t)(U) (generally identified by reference numeral 45(t)(u)). For each snapshot 1, 2, . . . , U, (generally "u") the correspondingly-indexed snapshot flags 45(t)(u) associated with the ones of the tracks 40(t) whose information is to be backed up for the snapshot will be set.

Generally, operations will proceed in the mass storage subsystem 12 in a manner similar to that described above in connection with FIGS. 1, 2A and 3, except that:

(a) The backup interface 21, when it determines whether to initiate a retrieval of information from a track $40(t_X)$ for transfer to the backup subsystem 13, will determine whether any of the flags $45(t_X)(u)$ of the snapshot entry $44(t_X)$ associated with the track $40(t_X)$ are set. If the backup interface 21 determines that any of the any of the snapshot flags $45(t_X)(u)$ are set, it will initiate the retrieval and transfer the information to the backup subsystem 13. On the other hand, if the backup interface 21 determines that none of the snapshot flags $45(t_X)(u)$ of the snapshot entry $44(t_X)$ associated with a track $40(t_X)$ are set, it will not initiate the retrieval or transmit any information therefrom to the backup subsystem 13;

(b) For each track $40(t_Y)$ whose information is transferred to the backup subsystem 13 for backup storage, the backup interface 21 will reset all of the snapshot flags $45(t_Y)(u)$ of the snapshot entry $44(t_Y)$ associated with the track $40(t_Y)$;

(c) The backup interface 21 will, along information from each respective track $40(t_Y)$ that is transferred to the backup subsystem 13 for backup storage, transfer a copy of the snapshot entry $44(t_Y)$ for the associated track $40(t_Y)$. The backup subsystem 13 will use the copy of the snapshot entry $44(t_Y)$ provided for the information for the associated track $40(t_Y)$ to identify the particular ones of the snapshots 1, 2, . . . , U which are to be taken of the information, for use as described below; and (d) When a host interface $20(n)$ is to engage in a storage operation to initiate storage, of information in a track $40(t_S)$, it will test all of the snapshot flags $45(t_S)(u)$ of the snapshot entry $40(t_S)$ associated with the track $40(t_S)$. If any of the snapshot flags $45(t_S)(u)$ are set, the host interface $20(n)$ will enable the backup interface 21 to initiate an out-of-turn retrieval of the information from the track $40(t_S)$ in which the information is to be stored, in a manner similar to that described above. The information will be retrieved from the track $40(t_S)$ and provided to the backup interface 21 for transfer to the backup subsystem 13 for backup storage, and the backup interface 21 will clear all of the snapshot flags $45(t_S)(u)$ of the snapshot entry $44(t)$ that is associated with the track (reference item (b) above). After all of the snapshot flags $45(t_S)(u)$ have been reset, the host interface $20(n)$ can store the information to be stored in the common memory 22, and thereafter enable the storage device interface 23 to retrieve the information from the common memory 22 for storage on the appropriate storage device $24(s)$.

Thus, when, for example, a first snapshot is to be taken in connection with a series of tracks $40(t_B), \ldots, 40(t_E)$, the snapshot flags $45(t_B)(1), \ldots 45(t_E)(1)$ in respective snapshot entries $45(t_B), \ldots, 45(t_E)$ will be set. The backup interface 21 will step through successive snapshot entries 44(1), 44(2), . . . 44(T) of the snapshot table 44. When the backup interface 21 locates a snapshot entry 44(t) in which at least one snapshot flag $45(t)(u)$ is set (reference item (a) above), it will initiate a retrieval operation in connection with the track 40(t) associated with the snapshot entry 44(t) f or transfer to the backup subsystem 13 for backup storage. In addition to the track, the backup interface 21 will transfer a copy of the snapshot entry 44(t) associated with the track 40(t) to the backup subsystem 13 (reference item (t) above) and reset all of the snapshot flags $45(t)(u)$ in the snapshot entry 44(t) (reference item (c) above). In addition, the backup interface 21 will sequence to the next snapshot entry 44(t+1) and repeat these operations. The backup interface 21 continually and iteratively sequences through the snapshot table 44, and so the snapshot flags $45(t)(1)$ may be conditioned for first snapshot when the backup interface 21 is processing a snapshot entry $44(t_I)$ $(t_B<t_I<t_E)$ associated with a track $40(t_I)$ that is intermediate the range of the tracks for which the snapshot is to be taken. In that case, the backup interface 21 will (i) initially transfer information from tracks $40(t_I), \ldots, 40(t_E)$ to the backup subsystem 13 for backup storage for the snapshot, except for any tracks $40(t_S)$ be in the range $40(t_B), \ldots, 40(t_I-1)$ which a host adapter $20(n)$ enables the backup interface 21 to take out of order, (ii) followed by information from tracks $40(t_B), \ldots, 40(t_I-1)$, also except for any tracks $40(t_S)$ in the range $40(t_B), \ldots, 40(t_I-1)$ which a host adapter $20(n)$ earlier enabled the backup interface 21 to take out of order.

When a second snapshot is to be taken in connection with a series of tracks $40(t_B'), \ldots, 40(t_E')$ (which may, but need not, correspond to the series of tracks $40(t_B), \ldots, 40(t_E)$ to be backed up in connection with the earlier snapshot), the snapshot flags $45(t_B')(2), \ldots 45(t_E')(2)$ in respective snapshot entries $45(t_B'), \ldots, 45(t_E')$ will be set. The backup interface 21 and host interfaces $20(n)$ will continue operations in a manner similar to those described above. Thus, while the backup interface 21 sequences through the successive snapshot entries 45(t) of the snapshot table 44, when it encounters a snapshot entry $45(t_X)$ for which either the snapshot flag $45(t_X)(1)$ or $45(t_X)(2)$ is set, will enable the information from the track $40(t_X)$ associated with the snapshot entry $45(t_X)$ to be retrieved and transfer it (that is, the information) to the backup subsystem 13, along with a copy of the snapshot entry $45(t_X)$. It will be appreciated that:

(a) If the information from the track $40(t_X)$ is to be part of both the first and second snapshots:

(i) If the information was previously transferred to the backup subsystem 13, the backup subsystem 13 will receive a second transfer of the information from the track $40(t_X)$. It will be appreciated that the information in the track may be modified during a storage operation initiated by a host interface $20(n)$ after the previous transfer, in which case the information transferred during the second transfer will differ from the information transferred during the previous transfer. The previously-transferred copy will have associated therewith a copy of the snapshot entry $45(t_X)$ in which the snapshot flag $45(t_X)(1)$ will be set, and the other snapshot flags in the snapshot entry $44(t_X)$ will be clear. Since the snapshot flag $45(t_X)(1)$ will be reset when the information from the track $40(t_X)$ is transferred to the backup subsystem 13, the second transfer will be associated with a snapshot entry $44(t_X)$ in which the snapshot flag $45(t_X)(2)$ will be set and the other snapshot flags, including snapshot flag $45(t_X)(1)$, will be clear. Concurrently with the second retrieval and transfer, the snapshot flag $45(t_X)(2)$ will also be cleared.

(ii) If the information was not previously transferred to the backup subsystem 13, the information will be transferred once, accompanied by a copy of the snapshot entry $44(t_X)$, to the backup subsystem 13. In this case, the information in the track $41)(t_X)$ will not have been modified between the times for the first and second snapshot, since otherwise the information from the track would have been transferred to the backup subsystem 13 prior to the modification, so that the information provided to the backup subsystem 13 would correspond to the information at the time for the first snapshot. The copy of the snapshot entry 44($t_X$) will have both snapshot flags 45($t_X$)(1) and 45($t_X$)(2) set, and the other flags clear.

(b) If the information from the track 40($t_X$) is to be part of the second snapshot, but not the first snapshot, information from the track 40($t_X$) will be transferred to the backup subsystem 13 once, to correspond to the state of the information at the time associated with the second snapshot. A copy of the snapshot entry 44($t_X$) will also be transferred. Since snapshot flag 45($t_X$)(1) will not have been set, but snapshot flag 45($t_X$)(2) will be set, in the copy of the snapshot entry 44($t_X$) that is transferred to the backup subsystem 13, snapshot flag 45($t_X$)(2) will be set and the other flags, including flag 45($t_X$)(1), clear.

Thus, the snapshot flags 45(t)(u) of the copy of the snapshot entry 44(t) that is provided with the information essentially identify the snapshots with which the information is associated and for which the information is valid.

The mass storage subsystem 12 and backup subsystem 13 will perform similar operations in connection with each subsequent snapshot.

It will be appreciated that the "U" snapshot flags 45(t)(u) in each snapshot entry 44(t) can be used in a round-robin basis. That is, following the "U-th" snapshot, in which the tracks to be backed up for the snapshot will be controlled by the "U-th" snapshot flag 45(t)(U), the tracks to be backed up for the "U+1st" snapshot will be controlled by the first snapshot flag 45(t)(1). In that case, if periodic snapshots are to be taken, the number "U" of snapshot flags 45(t)(u) in each snapshot entry 44(t) will preferably be selected to be at least the integer greater than the time required to transfer the information from all of the tracks to be backed up for the snapshot divided by the time period between snapshots.

As described above, information from each track 40(t) that is transferred to the backup subsystem 13 is accompanied by a copy of the snapshot entry 44(t) associated therewith. The snapshot flags 45(t)(u) comprising the snapshot entry 44(t) identifies the ones of the snapshots with which the information is associated and for which the information is valid. In the backup subsystem 13, each of the drives 34(d) is used to record, onto the backup cartridges provided thereto, information related to one of the snapshots. Otherwise stated, each of the drives 34(d) records information for which one of the snapshot flags 45(t)(u) is set. Thus, for example, drive 34(1) will be used to record information for which snapshot flag 45(t)(1) is set, drive 34(2) will be used to record information for which snapshot flag 45(t)(2) is set, and so forth. Thus, when information from a track is selected for transfer from the cell 35 in the buffer 31 in which it was being buffered, to one of the backup drives 34(d) for recording, the one or ones of the snapshot flags 45(t)(u) of the copy of the snapshot entry 44(t) associated therewith will be examined, and the information will be transferred to the one or ones of the drives 34(d) which are used to record information for the snapshot flag(s) which is/are set. It will be appreciated that at least one of the snapshot flags 45(t)(u) will be set, so that the information will be transferred to at least one drive 34(d) for recording. By associating backup drives 34(d) with respective snapshot flags 45(t)(u), the information associated with each snapshot can be compactly aggregated onto one or more backup cartridges 33, rather than being randomly distributed thereover, so that information from only a few cartridges need be retrieved if a restoration is required.

Figure 4:
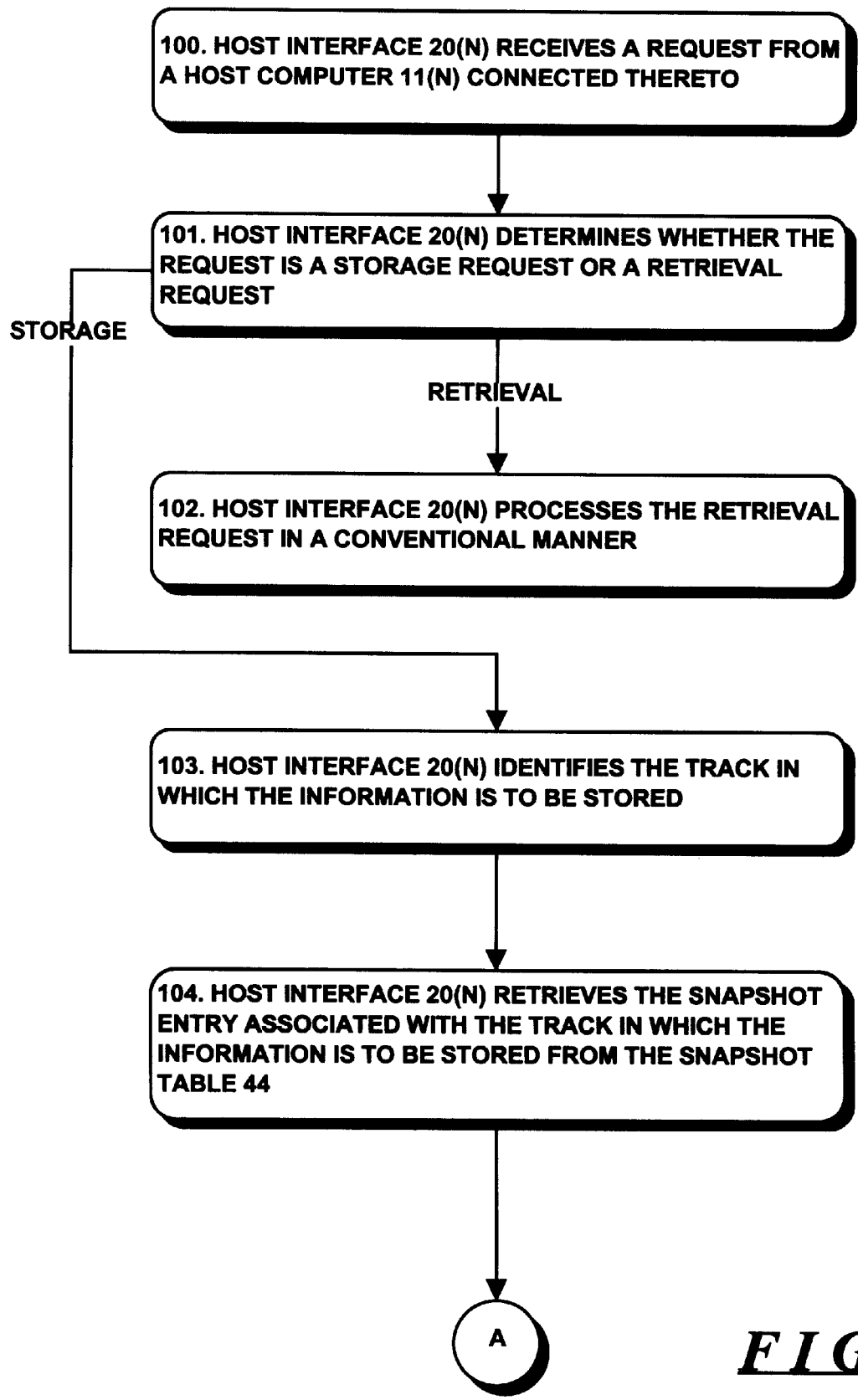
FIGS. 4 and 5 depict flowcharts describing operations performed by the system 10 in connection with the invention.
Figure 4A:
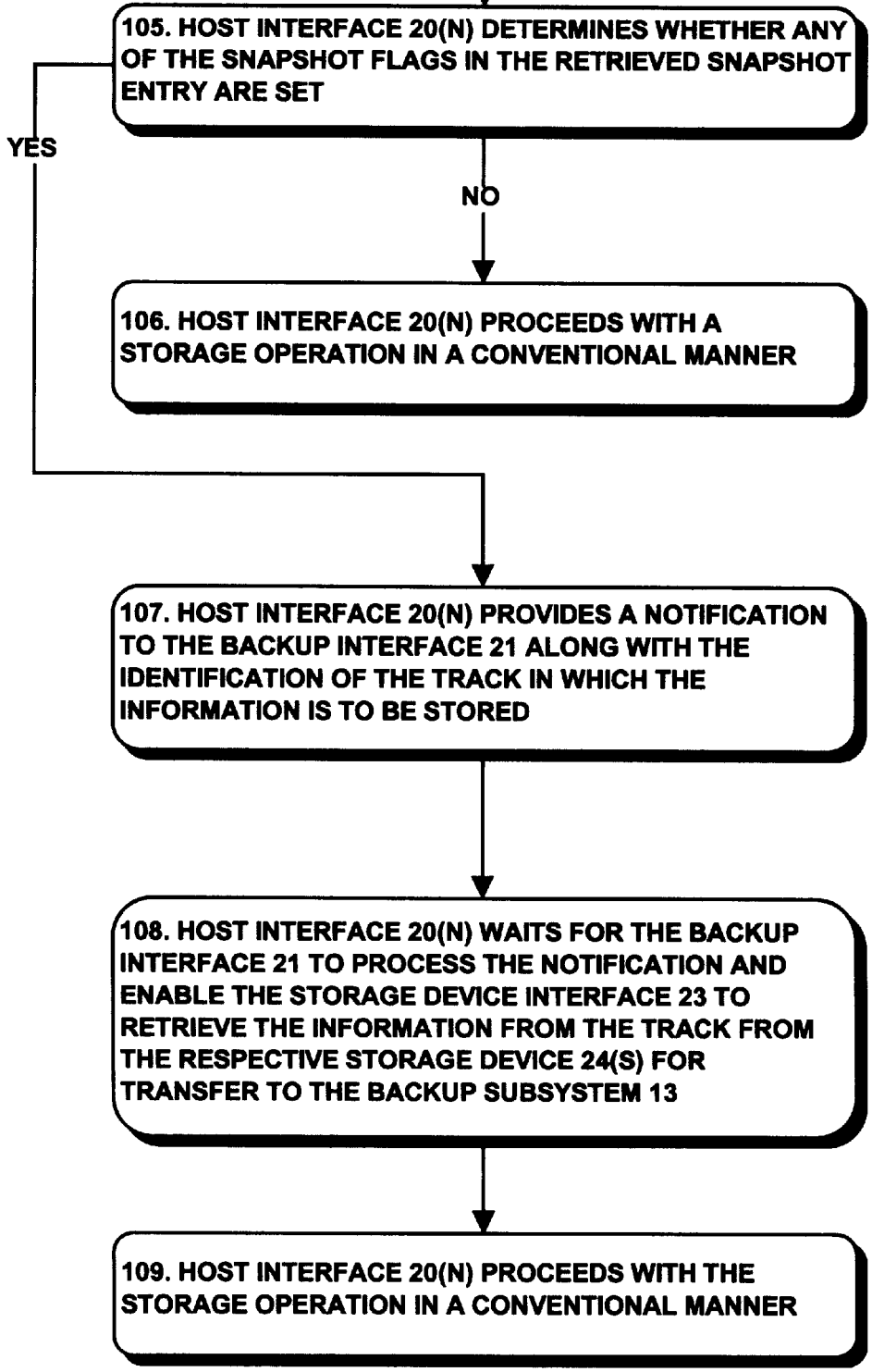
Figure 5:
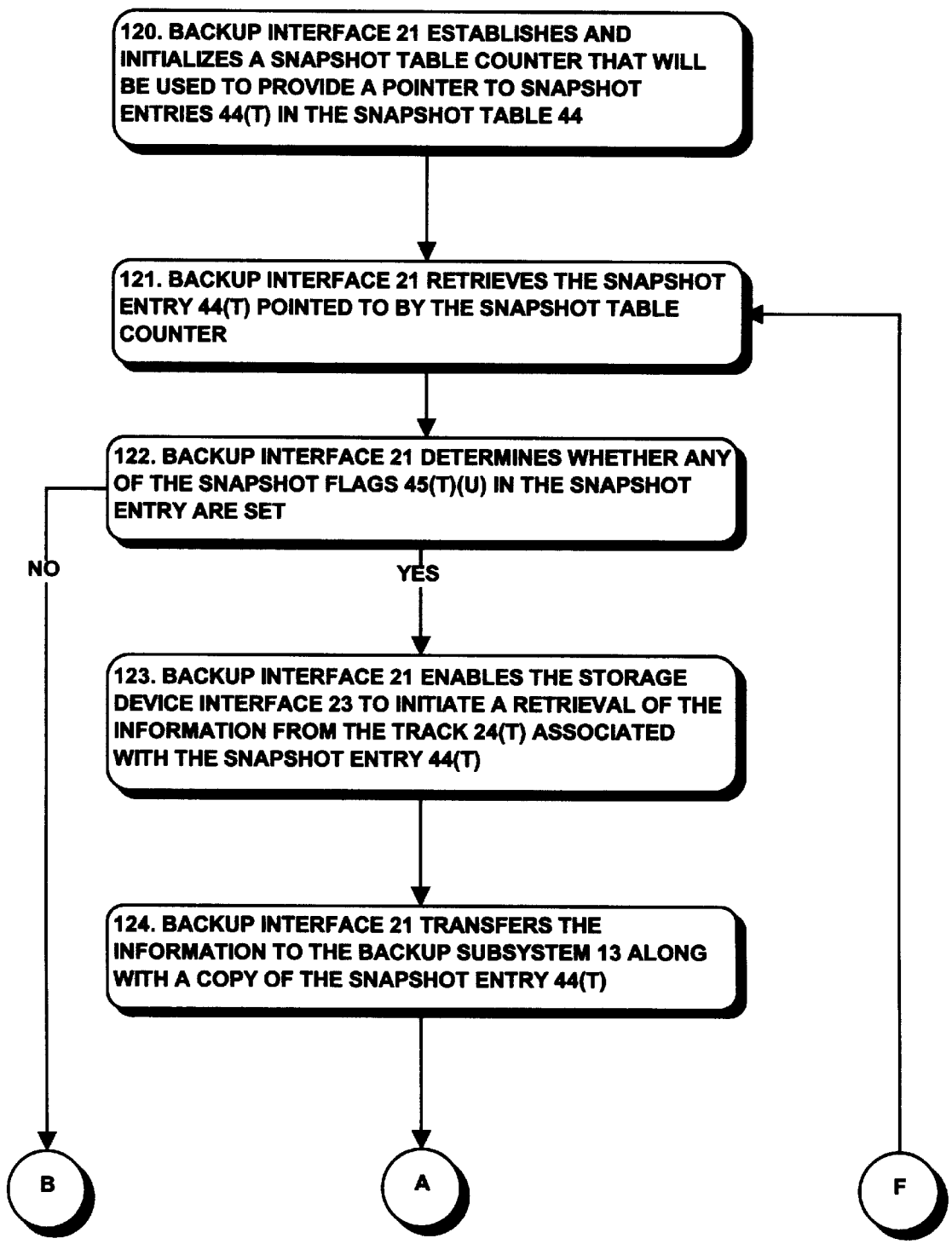
Figure 5A:
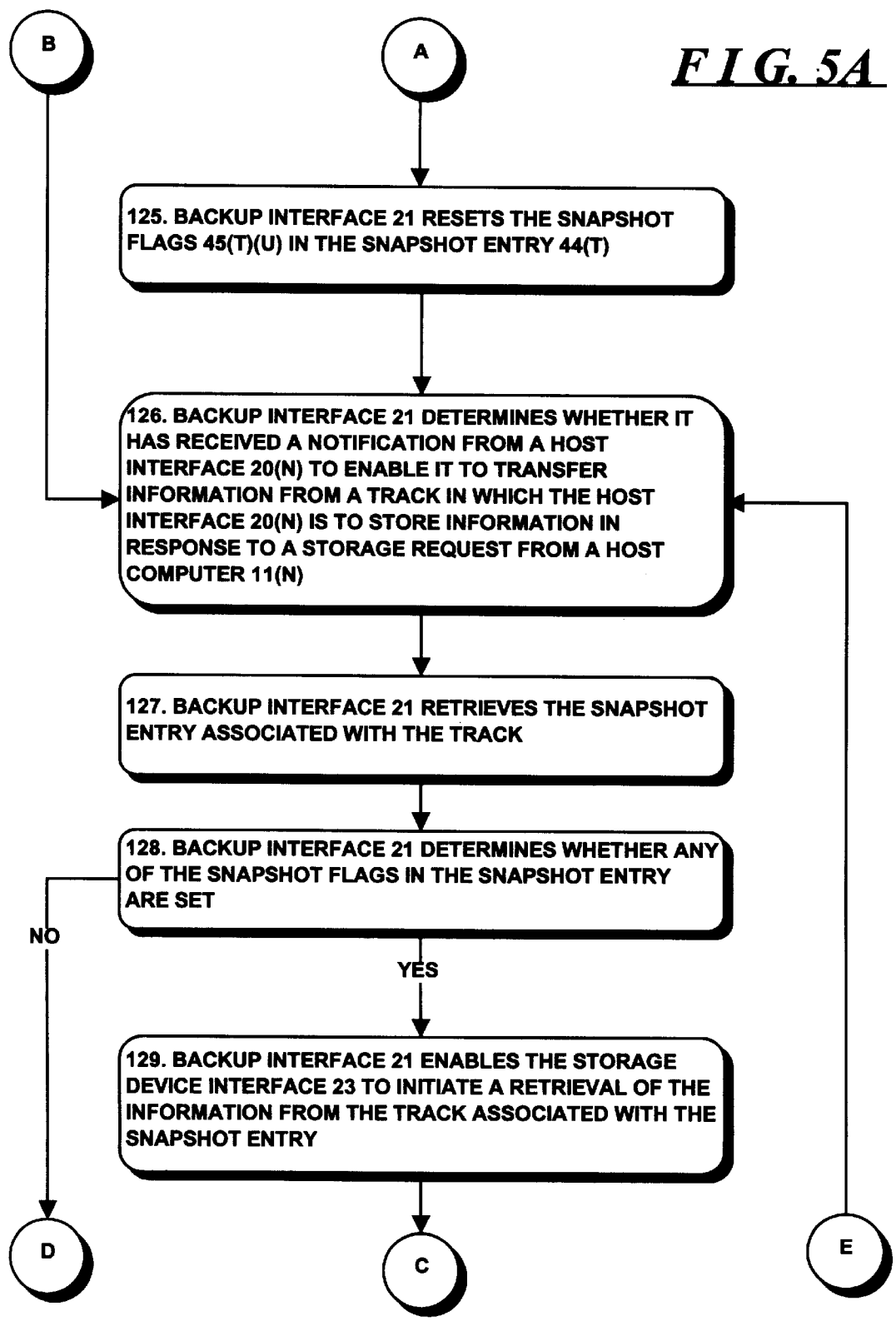
Figure 5B:
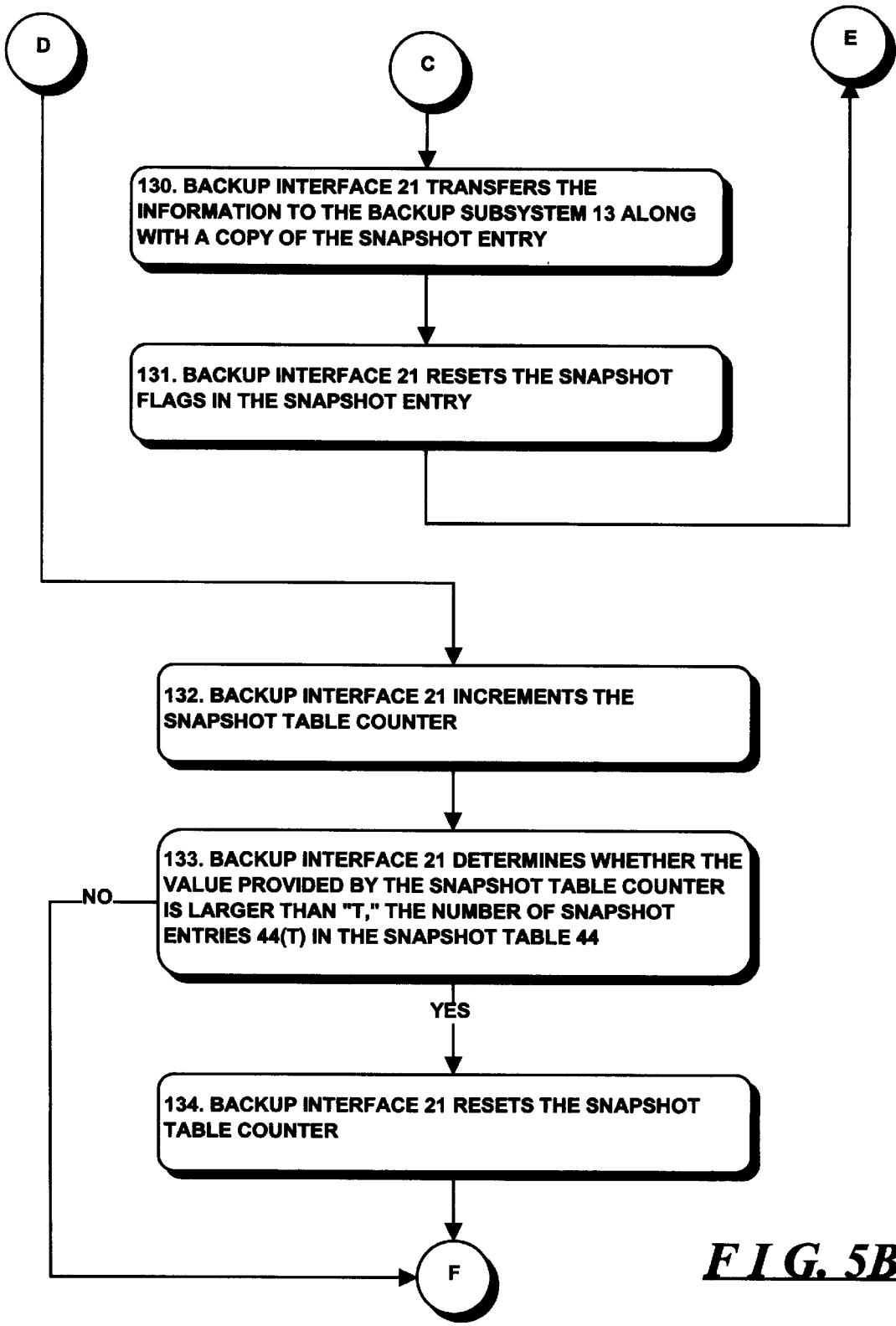

With this background, the operations performed by a host interface 20(n) and backup interface in connection with the invention, particularly the aspects described above in connection with FIGS. 1 and 2B, will be described in detail in connection with the flowcharts depicted in FIGS. 4 and 5, respectively. In the following, it will be assumed that the particular tracks 40(t) which are to be backed up for a snapshot are selected by a host computer 11(n) or by a component or internal process of the mass storage subsystem 12 in a conventional manner, which will not be described herein. In addition, it will be assumed that the snapshot flags 45(t)(u) will be set to identify the tracks 40(t) which are to be backed up for each snapshot as selected by the host computer 11(n) or component or internal process of the mass storage subsystem 12. FIG. 4 depicts the operations performed by the host interface 20(n) in response to a storage or retrieval request received from a host computer 11(n), particularly in connection with the use of the snapshot table to determine whether a storage request requires storage of information in a track 40(t) which is to be backed up for a snapshot, and notification of the backup interface 21 in response to a positive determination. FIG. 5 depicts operations performed by the backup interface 21 in identifying the tracks to be backed up and retrieving the information therefrom and trnasferring it to the backup subsystem 13.

Thus, with reference to FIG. 4, when the host interface 20(n) receives a request from a host computer 11(n) connected thereto (step 100), it will initially determine whether the request is a storage request or a retrieval request (step 101). If the host interface 20(n) determines that the request is a retrieval request, it will sequence to step 102 to process the retrieval request in a conventional manner. Since retrieval of information from a track 40(t) does not change the information stored in the track, the information need not be retrieved by the backup interface 21 prior to completion of the retrieval request if a backup operation is taking place for a snapshot.

On the other hand, if the host interface 20(n) determines in step 101 that the request is a storage request, it will sequence to step 103 to identify the track 40($t_S$) in which the information is to be stored. Thereafter, the host interface 20(n) will retrieve the snapshot entry 44($t_S$) associated with the track 40($t_S$) in which the information is to be stored, from the snapshot table 44 (step 104) and determine whether any of the snapshot flags 45($t_S$)(u) in the snapshot entry 44($t_S$) are set (step 105). If the host interface 20(n) determines in step 105 that none of the snapshot flags 45($t_S$)(u) are set, it will proceed with a storage operation in a conventional manner (step 106).

On the other hand, if the host interface 20(n) determines in step 105 that at least one snapshot flag 45($t_S$)(u) of the snapshot entry 44($t_S$) is set, it will provide a notification to the backup interface 21 along with the identification of the track 40($t_S$) in which the information is to be stored (step 107). Thereafter, the host interface 20(n) will wait for the backup interface 21 to process, the notification and enable the storage device interface 23 to retrieve the information from the track 40($t_S$) from the respective storage device 24(s) for transfer to the backup subsystem 13 (step 108). After the information has been retrieved, the host interface 20(n) can proceed with the storage operation in a conventional manner (step 109).

Operations performed by the backup interface 21 will be described in connection with FIG. 5. With reference to FIG. 5, the backup interface 21 will initially establish and initialize a snapshot table counter (not separately shown) that will be used to provide a pointer to snapshot entries 44(t) in the snapshot table (step 120). Thereafter, the backup interface 21 will retrieve the snapshot entry 44(t) pointed to by the snapshot table counter (step 121) and determine whether any of the snapshot flags 45(t)(u) in the snapshot entry are set (step 122). If the backup interface 21 determines that at least one snapshot flag 45(t)(u) of the snapshot entry is set, it will enable the storage device interface 23 to initiate a retrieval of the information from the track 24(t) associated with the snapshot entry 44(t) (step 123) and transfer the information to the backup subsystem 13, along with a copy of the snapshot entry 44(t) (step 124). Thereafter, the backup interface 21 will reset the snapshot flags 45(t)(u) in the snapshot entry 44(t) (step 125).

Following step 125, or step 122 if the backup interface makes a negative determination in that step, it (that is, the backup interface 21) will then determine whether it has received a notification from a host interface 20(n) to enable it (that is, the backup interface 21) to transfer information from a track $40(t_S)$ in which the host interface 20(n) is to store information in response to a storage request from a host computer 11(n) (step 126). If the backup interface makes a positive determination in step 126, it will retrieve the snapshot entry $44(t_S)$ associated with the track $40(t_S)$ (step 127) and determine whether any of the snapshot flags $45(t_S)(u)$ in the snapshot entry are set (step 128). If the backup interface 21 determines that at least one snapshot flag $45(t_S)(u)$ of the snapshot entry is set, it will enable the storage device interface 23 to initiate a retrieval of the information from the track $24(t_S)$ associated with the snapshot entry $44(t_S)$ (step 129) and transfer the information to the backup subsystem 13, along with a copy of the snapshot entry $44(t_S)$ (step 130). Thereafter, the backup interface 21 will reset the snapshot flags $45(t_S)(u)$ in the snapshot entry $44(t_S)$ (step 131). Following step 131, the backup interface 21 will return to step 126 to determine whether another unprocessed notification has been received from a host interface 20(n). The backup interface 21 will iteratively process steps 126 through 131 until all of the notifications from the host interfaces 20(n) are processed.

Returning to step 128, if the backup interface 21 makes a negative determination in that step, the backup interface 21 will sequence to step 132 to increment the snapshot table counter. The backup interface 21 will then determine whether the value provided by the snapshot table counter is larger than "T," the number of snapshot entries 44(t) in the snapshot table 44 (step 133) and, if so, it will reset the snapshot table counter (step 134). Following step 134, or step 133 if it makes a negative determination in that step, the backup interface 21 will return to step 121 to process the snapshot entry pointed to by the snapshot table counter.

The invention provides a number of advantages. In particular, it allows the host computers to continue operations while information stored on the mass storage subsystem 12 is being backed up, while at the same time ensuring that the backed up information corresponds to the information at the beginning of the backup operation. In addition, the invention allows for overlapping snapshots to be taken of the information stored on the mass storage subsystem, while ensuring that the information in each snapshot corresponds to the information at the beginning of the snapshot.

It will be appreciated that a number of modifications may be made to the invention. For example, the backup interface 21 need not complete all of the backup operations in connection with one of the tracks before initiating backup operations in connection with other tracks; backup operations in connection with a number of tracks can be performed concurrently. In addition, a variety of mechanisms may be used to provide notifications among the host interfaces 20(n), backup interface 21 and storage device interface 23.

In addition, while the invention has been described in connection with backing up of information stored on disk storage devices, it will be appreciated that the invention may be used in connection with backing up of information stored on any type of storage device. Furthermore, while the mass storage subsystem 12 and backup subsystem 13 have been described as providing for the backing up of information in units or blocks each comprising an individual track of a disk storage device, it will be appreciated that other units or blocks of storage, such as individual or clusters of sectors, multiple tracks, and the like may be conveniently used.

Furthermore, while the backup subsystem 13 has been described as providing for cells 50 which store information from one specific number of tracks, in particular, ten tracks, it will be appreciated that a backup subsystem useful with the invention may provide for cells which store information from any number of tracks.

In addition, although the invention has been described in connection with backing up of information stored on a series of tracks $40(t_B) \ldots 40(t_E)$ during a backup operation, it will be appreciated several non-overlapping series of tracks $40(t^1_B) \ldots 40(t^1_E), 40(t^2_B) \ldots 40(t^2_E) \ldots$ (superscripts 1, 2, etc., referencing the respective series) may be backed up during the backup operation. In that case, the appropriate series of bits 42(t) of backup bit map 42 will be set at the beginning of the backup operation, or the appropriate snapshot flags 45(t)(u) of snapshot table 44, will be set for the appropriate snapshot.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A mass storage subsystem comprising:
   A. at least one storage device configured to store information in a plurality of storage blocks;
   B. a backup status table including a plurality of backup status indicators each associated with one of the storage blocks, each backup status indicator comprising a series of snapshot flags, each snapshot flag associated with one of a plurality of snapshots of information stored on said storage device, each snapshot flag having a snapshot backup state if the associated storage block is to be backed up as a snapshot during a backup operation, and a second state;

C. a backup interface configured to:
  i. sequence through the block backup status table and perform a backup operation in connection with respective storage blocks whose associated snapshot flags are in the backup state; and
  ii. in response to a backup request in connection with a respective one of said storage blocks, perform a backup operation in connection therewith; the backup interface being further configured to, as respective storage blocks are backed up during the backup operation,
  iii. transfer, along with the information from respective storage blocks, the respective backup status indicator associated therewith, to the backup subsystem, and
  iv. condition the snapshot flags associated therewith to the second state; and D. a host interface configured to, prior to storing information on said storage device, use the block status table to determine whether the backup status indicator associated with one of said storage blocks in which the information is to be stored has a snapshot flag in the backup state and, if so, generate said backup request for provision to said backup interface.

2. A mass storage subsystem as defined in claim 1 in which said host interface is further configured to, if the snapshot flags of the backup status indicator is in the second state, store the information in said storage block without generating said backup request.

3. A mass storage subsystem as defined in claim 1 in which said host interface is further configured to retrieve information from said storage device.

4. A mass storage subsystem as defined in claim 3 in which said host interface is configured to retrieve information from said storage device without using the backup status table to determine whether the state of the backup status indicator associated with one of said storage blocks in which the information is to be stored.

5. A mass storage subsystem as defined in claim 1 in which said storage device comprises a disk storage device which stored information in a plurality of tracks, each storage block comprising one track.

6. A mass storage subsystem as defined in claim 1 further comprising a backup subsystem for receiving information from said backup interface and storing the received information on a backup storage medium.

7. A mass storage subsystem as defined in claim 1 further comprising a backup subsystem comprising a plurality of backup storage devices each associated with one of said snapshots and a backup control configured to couple information from respective storage blocks received from said backup interface to selected ones of said backup storage devices based on the states of the snapshot flags of the backup status indicator associated with the respective storage blocks.

8. A mass storage subsystem as defined in claim 1 in which the storage blocks are associated with respective ones of a series of block identifiers, the subsystem further comprising a backup subsystem comprising at least one backup storage device, a buffer, and a backup control, the backup control being configured to allocate at least one cell in said buffer for storing information from the storage blocks received from said backup interface associated with a sequence of block identifiers in said cell thereby to buffer said information in the buffer, and to enable the information in the cell to be transferred to the backup storage device after information from all of the storage blocks associated with the cell has been received.

9. A mass storage subsystem as defined in claim 1 further comprising a backup control for conditioning the snapshot flags of the backup status table.

10. A backup subsystem configured to back up information stored on a mass storage subsystem, to provide a plurality of snapshots of the information stored on the mass storage subsystem, the backup subsystem comprising:
  A. a plurality of backup storage devices each configured to store information for one of said snapshots; and
  B. a backup control configured to receive blocks of information from the mass storage subsystem, each block being associated with a backup status indicator comprising a series of snapshot flags, each snapshot flag associated with one of a plurality of snapshots of information stored on said storage device, each snapshot flag having a snapshot backup state if the associated storage block is to be backed up as a snapshot during a backup operation and said second state, the backup control selectively coupling each block to respective ones of said backup storage devices based on the conditions of the respective snapshot flags of the backup status indicator associated therewith.

11. A backup subsystem configured to backup information stored on a mass storage subsystem, the information being stored on the mass storage subsystem in a plurality of storage blocks associated with respective ones of a series of block identifiers, the backup subsystem comprising at least one backup storage device, a buffer, and a backup control, the backup control being configured to allocate at least one cell in said buffer for storing information from the storage blocks received from said backup interface associated with a sequence of block identifiers in said cell thereby to buffer said information in the buffer, and to enable the information in the cell to be transferred to the backup storage device after information from all of the storage blocks associated with the cell has been received.

12. A method of controlling a mass storage subsystem comprising at least one storage device configured to store information in a plurality of storage blocks and a backup status table including a plurality of backup status indicators each associated with one of the storage blocks, each backup status indicator comprising a series of snapshot flags, each snapshot flag associated with one of a plurality of snapshots of information stored on said storage device, each snapshot flag having a snapshot backup state if the associated storage block is to be backed up as a snapshot during a backup operation and a second state, the method comprising the steps of
  A. sequencing through the block backup status table and performing a backup operation in connection with respective storage blocks and backup status indicators whose associated snapshot flags are in the backup state, and condition the snapshot flags associated therewith to the second state;
  B. in response to a backup request in connection with a respective one of said storage blocks, perform a backup operation in connection therewith and with the backup status indicator associated therewith, and condition the status flags of the backup status indicator associated therewith to the second state; and
  C. prior to storing information on said storage device, using the block status table to determine whether the snapshot flags associated with one of said storage blocks in which the information is to be stored is in the backup state and, if so, generate said backup request.

13. A method as defined in claim 12 further comprising the step of, if the snapshot flags of the backup status indicator are in the second state, storing the information in said storage block without generating said backup request.

14. A method as defined in claim 12 further comprising the step of retrieving information from said storage device.

15. A method as defined in claim 14 in which, during the information retrieval step, information is retrieved from said storage device without using the backup status table to determine whether the state of the backup status indicator associated with one of said storage blocks in which the information is to be stored.

16. A method as defined in claim 12 in which said storage device comprises a disk storage device which stored information in a plurality of tracks, each storage block comprising one track.

17. A method as defined in claim 12 further comprising the step of storing the received information on a backup storage medium.

18. A method as defined in claim 14, the mass storage subsystem further comprising a plurality of backup storage devices each associated with one of said snapshots, the method further comprising the step of coupling information from respective storage blocks to selected ones of said backup storage devices based on the states of the snapshot flags of the backup status indicator associated with the respective storage blocks.

19. A method as defined in claim 12 in which the storage blocks are associated with respective ones of a series of block identifiers, the method further comprising the steps of allocating at least one cell in a buffer for buffering information from the storage blocks to be backed up associated with a sequence of block identifiers in said cell thereby to buffer said information in the buffer, and transferring the buffered information to the backup storage device after information from all of the storage blocks associated with the cell has been received.

20. A method as defined in claim 12 further comprising the step of conditioning the backup status indicators of the backup status table.

21. A method of controlling a backup subsystem to back up information stored on a mass storage subsystem to provide a plurality of snapshots of the information stored on the mass storage subsystem, the backup subsystem including a plurality of backup storage devices each configured to store information for one of said snapshots; the method comprising the steps of:

A. receiving blocks of information from the mass storage subsystem, each block being associated with a backup status indicator comprising a series of snapshot flags, each snapshot flag associated with one of a plurality of snapshots of information stored on said storage device, each snapshot flag having a snapshot backup state if the associated storage block is to be backed up as a snapshot during a backup operation and said second state; and B. selectively coupling each block to respective ones of said backup storage devices based on the conditions of the respective snapshot flags of the backup status indicator associated therewith.

22. A method of controlling backup subsystem configured to backup information stored on a mass storage subsystem, the information being stored on the mass storage subsystem in a plurality of storage blocks associated with respective ones of a series of block identifiers, the method comprising the steps of:

A. allocating at least one cell in a buffer for storing information from the storage blocks received from said mass storage subsystem associated with a sequence of block identifiers in said cell thereby to buffer said information in the buffer, and B. transferring information in the cell to a backup storage device after information from all of the storage blocks associated with the cell has been received.

* * * * *

UNITED STATES PATENT AND TRADEMARK OFFICE
CERTIFICATE OF CORRECTION

PATENT NO. : 6,076,148
DATED : June 13, 2000
INVENTOR(S) : Nadav Kedem and Haim Bitner Page 1 of 1

It is certified that error appears in the above-identified patent and that said Letters Patent is hereby corrected as shown below:

Title page,
Item [75],
Adding second investor: Haim Bitner, Raanana, Israel

Signed and Sealed this

Twenty-eighth Day of August, 2001

*Attest:*

*Attesting Officer*

NICHOLAS P. GODICI
*Acting Director of the United States Patent and Trademark Office*